(12) United States Patent
Barnett et al.

(10) Patent No.: US 9,945,039 B2
(45) Date of Patent: Apr. 17, 2018

(54) METHOD FOR IMPROVING THE EFFICIENCY AND DURABILITY OF ELECTRICAL ENERGY STORAGE USING SOLID OXIDE ELECTROLYSIS CELL

(75) Inventors: Scott A. Barnett, Evanston, IL (US); David M. Blerschank, Evanston, IL (US); James R. Wilson, San Francisco, CA (US)

(73) Assignee: Northwestern University, Evanston, IL (US)

(*) Notice: Subject to any disclaimer, the term of this patent is extended or adjusted under 35 U.S.C. 154(b) by 1069 days.

(21) Appl. No.: 13/156,230

(22) Filed: Jun. 8, 2011

(65) Prior Publication Data

US 2012/0003552 A1    Jan. 5, 2012

Related U.S. Application Data

(60) Provisional application No. 61/352,656, filed on Jun. 8, 2010.

(51) Int. Cl.
| | |
|---|---|
| *H01M 8/06* | (2016.01) |
| *C25B 1/02* | (2006.01) |
| *C25B 3/04* | (2006.01) |
| *C25B 15/02* | (2006.01) |
| *H01M 8/0612* | (2016.01) |
| *H01M 8/18* | (2006.01) |
| *H01M 8/0662* | (2016.01) |
| *H01M 8/124* | (2016.01) |

(52) U.S. Cl.
CPC .............. *C25B 1/02* (2013.01); *C25B 3/04* (2013.01); *C25B 15/02* (2013.01); *H01M 8/0618* (2013.01); *H01M 8/186* (2013.01); *H01M 8/0662* (2013.01); *H01M 2008/1293* (2013.01); *Y02E 60/528* (2013.01)

(58) Field of Classification Search
CPC ...... H01M 8/18–8/188; H01M 8/0618; H01M 8/0662
USPC ................................ 429/422, 408, 416–418
See application file for complete search history.

(56) References Cited

U.S. PATENT DOCUMENTS

| | | | |
|---|---|---|---|
| 7,201,979 B2 | 4/2007 | McElroy et al. | |
| 7,572,530 B2 | 8/2009 | Gottmann et al. | |
| 2004/0191598 A1* | 9/2004 | Gottmann et al. | 429/30 |

OTHER PUBLICATIONS

Journal of Power Sources, 2006, v. 163 n. 1 SPEC. ISS., p. 460-466 DOI: http://dx.doi.org/10.1016/j.jpowsour.2006.09.024.*
International Journal of Hydrogen Energy, 2007, v. 32, Issue 13, Sep. 2007, pp. 23052313 DOI: 10.1016/j.ijhydene.2007.03.001.*

(Continued)

*Primary Examiner* — Jimmy Vo
(74) *Attorney, Agent, or Firm* — Reinhart Boerner Van Deuren s.c.

(57) ABSTRACT

A method for improving the efficiency and durability of reversible solid oxide cells during electrical energy storage is disclosed. The method utilizes a specific set of operating conditions that produces a storage chemistry where approximately thermal-neutral operation can be achieved at low cell over-potentials. Also disclosed are reversible solid oxide cell energy storage system configurations, including one that utilizes storage in natural gas and water storage/distribution networks, thereby reducing storage cost.

18 Claims, 36 Drawing Sheets

(56) References Cited

OTHER PUBLICATIONS

J. Pettersson, B. Ramsey, D. Harrison, "A review of the latest developments in electrodes for unitised regenerative polymer electrolyte fuel cells", Elsevier, Journal of Power Sources 157 (2006) 28-34.

J. Yan, H. Matsumoto, T. Akbay, T. Yamada, T. Ishihara, "Preparation of LaGa03-based perovskite oxide film by a pulsed-laser ablation method and application as a solid oxide fuel cell electrolyte", Elsevier, Journal of Power Sources 157 (2006) 714-719.

Z. Zhan, W. Kobsiriphat, J. Wilson, M. Pillai, I. Kim, S. Barnett, "Syngas production by coelectrolysis of CO2/H20: The basis for a renewal energy cycle", Energy & Fuels, 2009, 23, 3089-3096.

* cited by examiner a)

b)

(a)

(b)

METHOD FOR IMPROVING THE EFFICIENCY AND DURABILITY OF ELECTRICAL ENERGY STORAGE USING SOLID OXIDE ELECTROLYSIS CELL

This patent application claims priority from U.S. Provisional Patent Application No. 61/352,656, filed on Jun. 8, 2010, which patent application is hereby incorporated herein by reference in its entirety.

This invention was made with government support under grant number CBET-0854223 awarded by the National Science Foundation. The government has certain rights in the invention.

FIELD OF THE INVENTION

The present invention relates generally to high conversion efficiency methods of reversible solid oxide cells during electrical energy storage. Specifically, the instant invention relates to a set of reversible solid oxide electrochemical cell (SOEC) operating conditions and storage chemistries that can achieve higher conversion efficiency than those of prior art devices. The methods disclosed herein take advantage of natural gas and water storage/distribution networks to minimize storage cost.

The present invention also relates to reversible solid oxide cell energy storage system configurations that reduce storage cost.

BACKGROUND OF THE INVENTION

Large-scale electrical energy storage is becoming increasingly necessary with the growing implementation of intermittent renewable energy sources such as wind and solar. However, there is a relative lack of viable storage technologies, i.e. hydroelectric water pumping and underground compressed air storage are well established but limited to specific geographic sites, whereas most batteries and ultra-capacitors have limited energy storage capacities and times. On the other hand, reversible fuel cells have low round-trip efficiency compared to the above-mentioned technologies.

Energy storage using reversible fuel cells can be understood using FIG. 1, which shows typical current-voltage curves in both fuel cell and electrolysis mode, for two different types of cells. The graph shows current-potential curves in $H_2/H_2O$ for a proton-exchange membrane (PEM) cell (Pettersson, et al., 2006 J. Power Sources 157, 28-34) and solid oxide cells (than, Z. et al., 2009 Energy Fuels 23, 3089-3096) in both electrolysis (negative current) and fuel cell (positive current) mode. Electrical energy is stored by electrolyzing water, and then electricity is produced using the $H_2$ in fuel cell mode.

Consider first the characteristics of a typical solid oxide electrochemical cell at 800° C. For the gas mixture in this test, the open-circuit potential (OCP) is 0.97 V. Connecting the cell to a load draws a positive current and decreases the voltage—the cell is oxidizing the $H_2$ in the fuel to produce electricity. When the cell is connected to an electrical source that imposes a voltage greater than the OCP, a negative current flows and the device electrolyzes $H_2O$ and $CO_2$ to $H_2$ and CO. In the latter process, the electrical energy is stored in chemical form, whereas in the former process chemical energy is converted back to electricity. The above also applies to the other characteristics shown, typical for a reversible PEM cell operating at ~60° C.

FIG. 2 shows schematically the key components of a renewable fuel production system and an electrical energy storage system, based on the reversible cells discussed above. The arrows and labels show the conversion of electrical energy to a fuel.

In this case, $H_2O$ and/or $CO_2$ are supplied as a feedstock for electrolysis in the solid oxide electrochemical cell. In other systems, the resulting fuel is a $H_2$—CO-rich mixture that is subsequently catalytically converted into alcohol or hydrocarbon fuels. FIG. 2 also shows an electricity storage configuration where two tanks are used, one to store a mostly-oxidized gas (predominately $H_2O$ and $CO_2$) that is introduced into the solid oxide electrochemical cell for electrolysis (darker arrows), with the resulting reduced gas (predominately $H_2$ and CO) stored in the second tank. This part of the cycle represents storage of electrical energy in chemical form, analogous to charging a battery. The reduced gas is the fuel for fuel cell operation (lighter arrows, analogous to discharging a battery), with the oxidized exhaust stored in the first tank. The oxygen electrode can utilize either ambient air or pure oxygen, the latter is produced during the electrolysis process and can be stored for use during the fuel cell part of the cycle. While the advantage of this system is the substantial improvement in the cell oxygen-electrode performance due to the five times increase in oxygen partial pressure compared to air, the disadvantage is the cost of the oxygen tank and associated hardware. The reversible system depicted in FIG. 2 is very similar to a flow battery.

While either the PEM or solid oxide cells can, in principle, be used in the systems shown in the FIG. 2, there are two limitations with the PEM cells. First, the PEM cells work only with $H_2/H_2O$, such that it is more difficult to produce alcohol and hydrocarbon fuels. Second, the low-temperature PEM cells always show a much larger overpotential, as seen by the very rapid change in voltage near zero current in FIG. 1, that is not seen in the solid oxide electrochemical cell. This difference is explained by the high temperature for solid oxide electrochemical cells, which promotes fast electrochemical reactions even without the use of the precious metal electro-catalysts used in the low-temperature cells. The relevance of this difference is seen by calculating the maximum theoretical round-trip efficiency $\eta=V_{FC}/V_{EL}$ of the reversible cell shown in FIG. 2, where $V_{FC}$ is the cell operating potential in fuel cell mode and $V_{EL}$ is the cell operating potential in electrolysis mode. Assuming that the current density is at least 0.5 A/cm² in a practical device, the low-temperature cell case provides for $\eta=0.71V/1.81V\sim39\%$, whereas the high-temperature cell provides for $\eta=0.87V/1.07\ V=0.81\%$ for ±0.5 A/cm².

Based on the above efficiency equations, it appears that a solid oxide electrochemical cell can easily yield high $\eta$. However, current solid oxide electrochemical cells are also not without their deficiencies; there is a lower limit on the electrolysis voltage $V_{EL}$ due to thermal balance requirements. That is, the electrical energy input into the cell must match the heat requirement of the endothermic electrolysis reactions, which at 800° C. are:

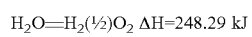

$$H_2O = H_2(\tfrac{1}{2})O_2 \ \Delta H = 248.29 \text{ kJ}$$

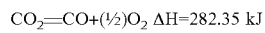

$$CO_2 = CO + (\tfrac{1}{2})O_2 \ \Delta H = 282.35 \text{ kJ}$$

The electrical work done by the cell in electrolyzing a mole of $H_2O$ (or $CO_2$) is $V_{EL}$xF, where z=2 for the above reactions and F is Faraday's constant. The electrical energy input matches the thermal requirement for electrolyzing a mole of $H_2O$ (or $CO_2$) when $$V_{EL,TN} = \Delta H/2F,$$

where $V_{EL,TN}$ is the thermal-neutral electrolysis voltage: 1.29 V for $H_2O$ and 1.46 V for $CO_2$. If the cell is operated below the thermal-neutral voltage during charging, the reaction will consume heat and the cell will cool uncontrollably. This is illustrated in FIG. 3 for a cell operating at 800° C. on $H_2$ with a steam content near 50% first in electrolysis mode and then in fuel cell mode. At this condition, $V_{TN}$=1.29 V, but to achieve 80% electrical efficiency, $V_{EL}$=1.085 V and $V_{FC}$=0.868 V. Because the electrolysis voltage is below the thermal-neutral voltage, the cell consumes heat during the charge cycle and will cool. Similarly, as the system discharges, the thermal-neutral voltage is considerably higher than the operating voltage and excess heat is generated. Under these conditions, the temperature of the cell cannot be maintained without an external heat source in electrolysis mode and substantial active cooling in fuel cell mode. A substantial amount of heat energy is wasted, unless heat storage can be implemented to use the heat during the next electrolysis cycle.

Thus, to maintain the cell temperature during electrolysis mode, the cell must be operated above the thermal-neutral voltage during charging and the efficiency is reduced to η=0.88V/1.29 V=68% for $H_2O$, and an even lower value for $CO_2$. Similar conclusions can be drawn for the fuel-production case shown in FIG. 2.

It is therefore desirable to provide a method for improving the efficiency and durability of electrical energy storage to cure the deficiencies presented above.

SUMMARY OF THE INVENTION

In light of the foregoing, it is an object of the present invention to provide a method of operating a solid oxide electrochemical cell (SOEC) that can overcome the limitations of the prior art mentioned above. Specifically, it is an object of the invention to provide a method of operating a solid oxide electrochemical cell comprising use of specific C—H—O gas mixtures. C—H—O mixtures are selected such that $V_{EL,TN}$ is reduced in order to improve the system efficiency.

It is further an object of the invention to provide a method for improving the efficiency and durability of electrical energy storage using SOECs. In particular, it is an object of the present invention to provide a method for producing a fuel from renewable electrical energy that is from between 10-20% more efficient than prior art methods. It is also an object of the present invention to provide a method for producing a fuel from renewable electrical energy that provides relatively long-term electrochemical electricity storage, wherein round-trip efficiencies reach from between 60-80%, compared to 40-60% for most reversible fuel cell technologies. It is further an object of the instant invention to provide a method for electrical energy storage comprising a SOEC, wherein degradation in the SOEC is mitigated.

It is another object of the invention to provide a reversible solid oxide cell energy storage system comprising a thermally-integrated catalytic reactor and a water boiler/condenser placed between storage tanks and fuel cell (electrodes and electrolyte). The energy storage system reduces storage costs, converts a fuel mixture of gases to nearly pure methane, reduces tank temperature to near ambient, and condenses $H_2O$ to allow storage as a liquid.

Accordingly, it will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

Other objects, features, benefits and advantages of the present invention will be apparent from this summary and the following descriptions of certain embodiments, and will be readily apparent to those skilled in the art. Such objects, features, benefits and advantages will be apparent from the above as taken into conjunction with the accompanying examples, data, and all reasonable inferences to be drawn therefrom. The disclosures in this application of all articles and references, including patents, are incorporated herein by reference.

DETAILED DESCRIPTION OF THE INVENTION

Illustrating certain non-limiting aspects and embodiments of this invention, a method for electrical energy storage is provided. Also provided is a method for fuel production.

Specifically, one embodiment of the invention is a method for fuel production comprising operating a solid oxide reversible cell in electrolysis mode while maintaining approximately thermo-neutral conditions at a cell operating potential of from between 1.0-1.3 V to generate a fuel mixture. Another embodiment is a method for electrical energy storage comprising operating a solid oxide reversible cell in electrolysis mode at a thermal-neutral voltage of from between 1.0-1.3 V, at a first operating temperature of 500-850° C., and a first operating pressure of 1-100 atmospheres to generate a fuel mixture comprising at least 10% methane; providing the fuel mixture, and oxygen or air, to the solid oxide reversible cell; and operating the solid oxide reversible cell in fuel cell mode using the provided fuel, and oxygen or air, at a second operating temperature of 500-850° C. and a second operating pressure of from between 1-100 atmospheres to produce electrical energy.

Figure 1:
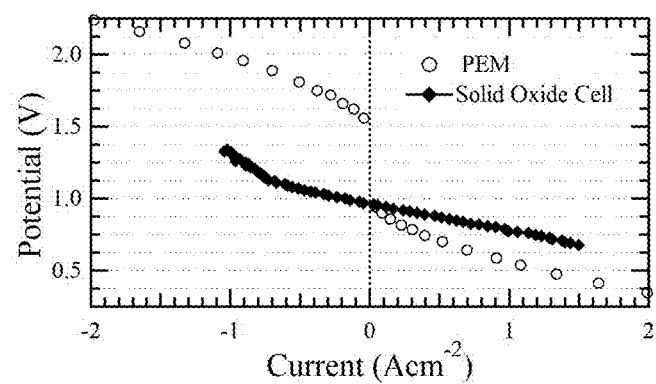
FIG. 1 depicts current-potential curves in $H_2/H_2O$ for PEM and solid oxide cells, in both electrolysis (negative current) and fuel cell (positive current) mode.
Figure 2:
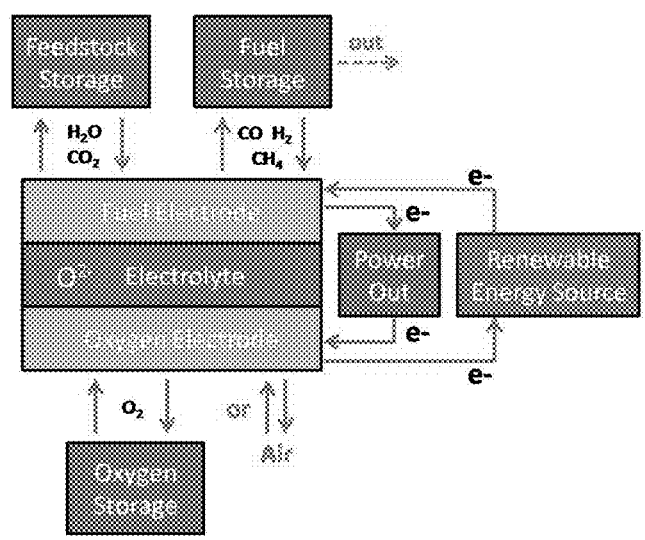
FIG. 2 is a schematic of an SOEC energy storage system.
Figure 3:
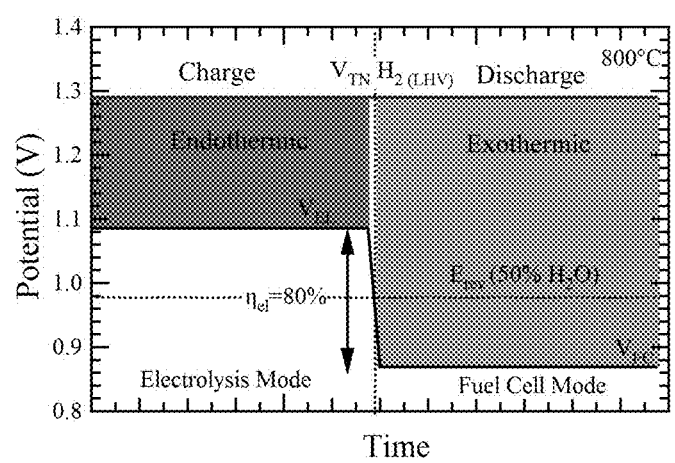
FIG. 3 is a schematic showing the consequences of operating below the thermoneutral voltage for a reversible system operating on water and $H_2$ at 800° C., wherein the Nernst Potential is denoted as $E_{rev}$.
Figure 4:
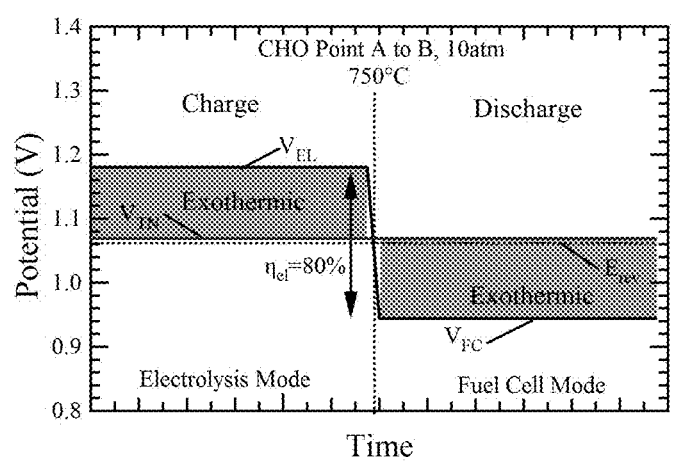
FIG. 4 is a schematic showing the operation of a fuel cell where Vtn≈$V_{NER}$, wherein the C—H—O mixture is at 750° C. and at 10 atm.

Regardless, parameter or parameters are used to effectively reduce $V_{EL,TN}$, and hence allow improved efficiency for the SOEC. For example, the various methods disclosed herein are operated at a reduced temperature. As another example, the various methods disclosed herein are operated at an elevated pressure. The pressure and/or temperature can also be optionally adjusted for a given C—H—O ratio to reduce $V_{TN}$ (thermal-neutral voltage). By operating at a reduced $V_{TN}$, the operation of the cell is thermally sustained at a high efficiency. A sample condition, presented in FIG. 4, illustrates that when $V_{TN}$ is similar to the Nernst Potential ($V_{NRE}$, approximately 1.0-1.1 V), heat is uniformly generated during both charging and discharging.

Figure 5:
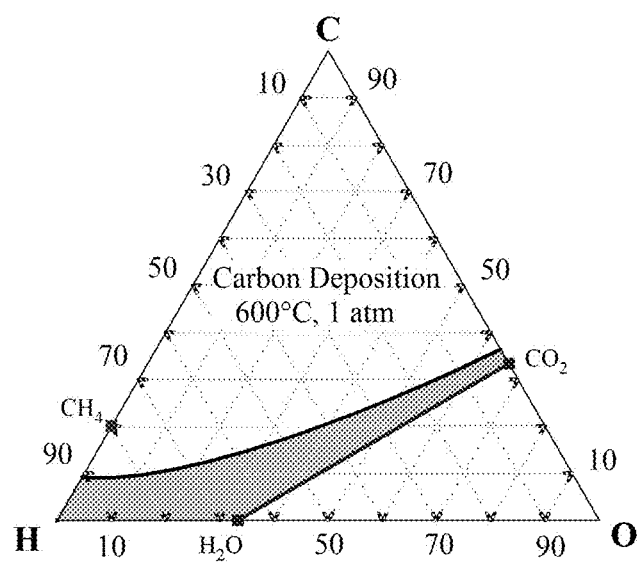
FIG. 5 depicts a C—H—O ternary diagram indicating the range of feasible gas compositions for the solid oxide electrochemical cell.

The C—H—O mixtures are also selected to avoid coke-forming conditions. The tendency for coking is assessed graphically using a C—H—O ternary phase diagram. The diagram in FIG. 5 shows the compositions for which graphite (coke) formation is expected at 600° C. and 1 atm. The grey-shaded region represents feasible gas compositions. Above the solid black line, solid graphite is expected at equilibrium and net carbon would be lost from the gases and the carbon formation on the cell electrode could damage the negative electrode. The coking line, together with the $CO_2$—$H_2O$ tie line (the fully oxidized composition), represent the practical limits for operation of the reversible oxide cell. It is noted that approaching the $CO_2$—$H_2O$ line in fuel cell mode can yield large concentration polarization in fuel cell operation due to low $H_2$ and CO content, and in extreme cases result in oxidation of Ni in the electrode.

Figure 6:
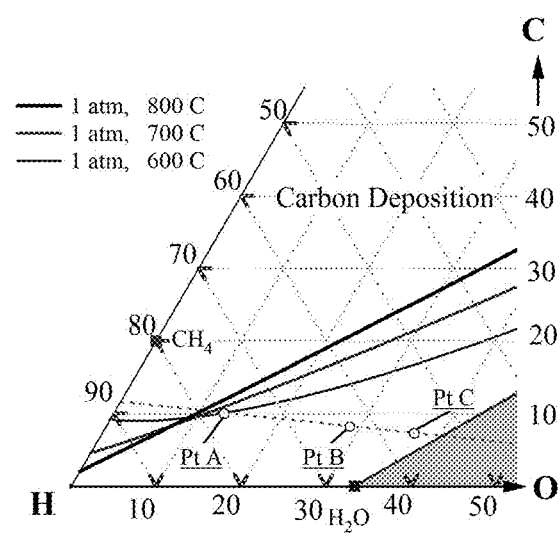
FIG. 6 shows a section of a C—H—O ternary diagram showing coking lines at 600, 700, and 800° C. at P=1 atm. The dark dashed line represents a C:H ratio of 1:7.7.
Figure 7:
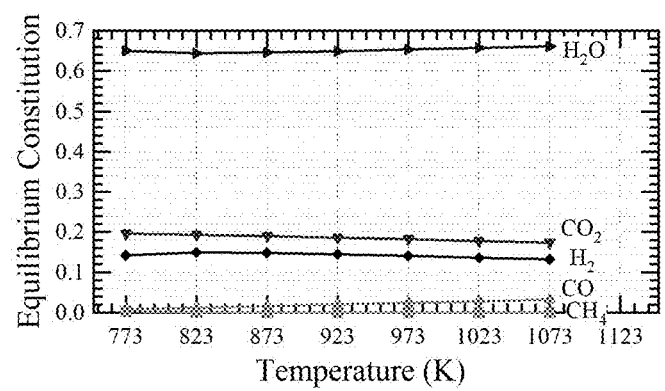
FIG. 7 shows gas constitution for a C:H:O ratio of 0.073 C:0.56 H:0.367 O from 500 to 800° C. (point C).

In an embodiment, the thermal-neutral voltage is decreased by decreasing the operating temperature to a range of 500-800° C., i.e. ≤800° C., and preferably ≤700° C., and more preferably to around 500-600° C. However, the temperature will generally vary depending on the pressure. The electrolysis of a gas mixture containing C, H, and O (i.e. $H_2$, $CO_2$, $CH_4$, $H_2O$, CO) with a specific C:H:O ratio of 0.073 C:0.56 H:0.367 O (See Table 1, point C) is considered. This composition is located at point C on the C—H—O ternary diagram in FIG. 6. At equilibrium, the constitution of this gas varies slightly with temperature (FIG. 7). As oxygen is removed from the gas, the composition of the gas passes through point B and approaches point A along the dashed line in FIG. 6.

TABLE 1

| Composition | C (mole fraction) | H (mole fraction) | O (mole fraction) |
| --- | --- | --- | --- |
| Point A | 0.1 | 0.77 | 0.13 |
| Point B | 0.082 | 0.631 | 0.287 |
| Point C | 0.073 | 0.560 | 0.367 |
| Point D | 0.114 | 0.875 | 0.011 |
| Point E | 0.109 | 0.837 | 0.054 |

Figure 8:
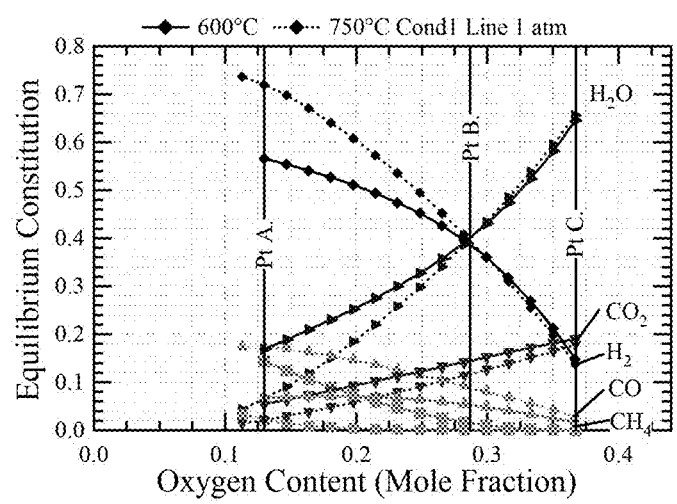
FIG. 8 shows gas constitution for a C:H ratio of 0.1:7.7 and changing oxygen content at 600° C. (solid line) and 750° C. (dashed line).
Figure 9:
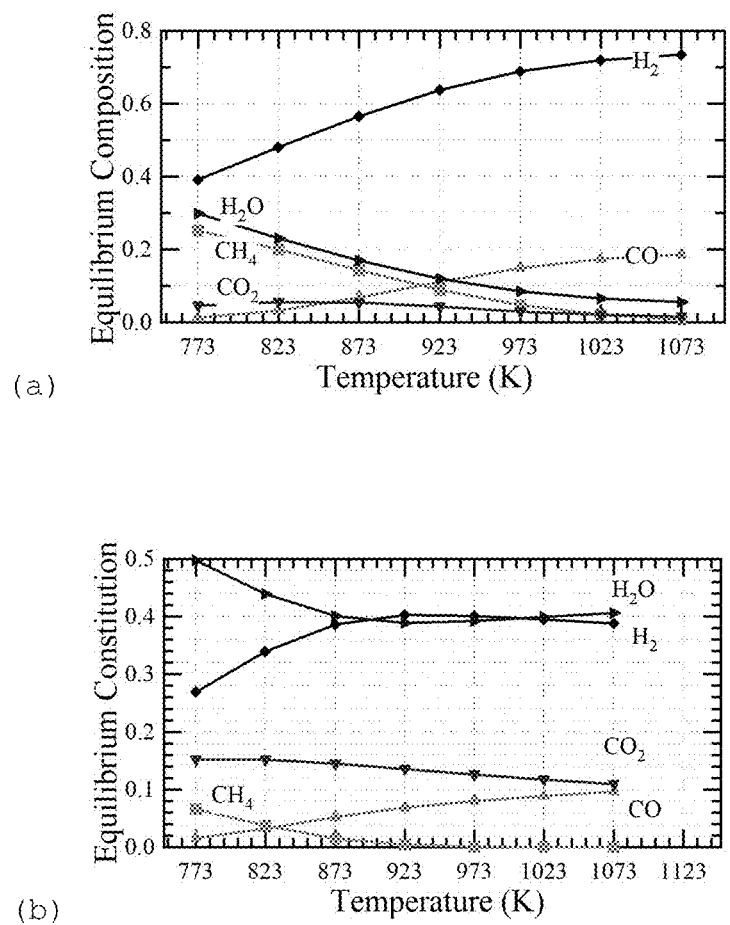
FIG. 9 shows gas constitution for (a) point A and (b) point B as a function of temperature.

As oxygen is removed from the gas in this manner, the equilibrium constitution of the gas begins to vary strongly as a function of temperature. FIG. 8 shows the equilibrium gas constitution of this gas mixture as oxygen is removed for two different temperatures. At 750° C. (dashed line), the hydrogen and carbon monoxide content increases strongly with decreasing oxygen content. In contrast, the equilibrium gas constitution at 600° C. contains more methane and less $H_2$ and CO compared to identical compositions at 750° C. The equilibrium gas constitution as a function of temperature at point A is displayed in FIG. 9.

The methane content increases and the $H_2$ and CO content decreases with decreasing temperature. Although these are only equilibrium predictions, it has been verified that gases under these conditions do indeed approach equilibrium. Thus, the results provide reasonable predictions of what is be expected in real solid oxide cells.

If the feedstock for the reversible cell has a composition at point C and after electrolysis has a composition at point A, the net enthalpy change associated with the electrolysis reaction is calculated, and the thermal-neutral electrolysis voltage is determined using equation (1).

$$V_{EL,TN} = \Delta H/2F \; (F=\text{Faraday's constant}) \quad (1)$$

Figure 10:
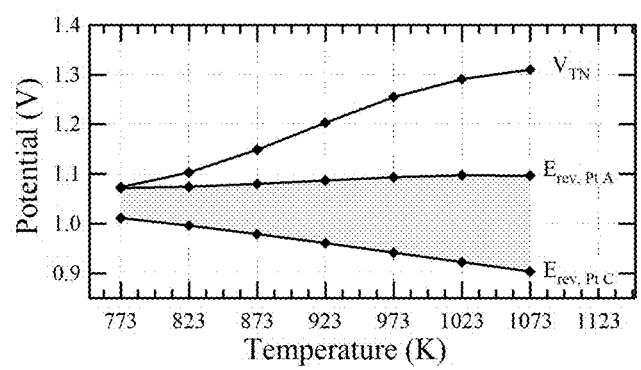
FIG. 10 is a graph showing Nernst and thermal-neutral potentials versus temperature for operation between point A and point C.
Figure 11:
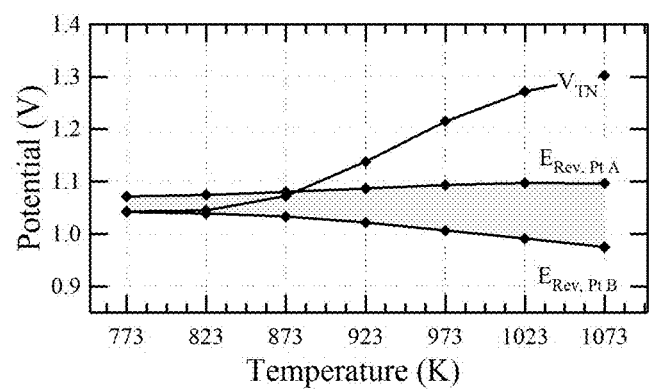
FIG. 11 is a graph showing Nernst and thermal-neutral potentials for operation between point A and point B.

The results are displayed in FIG. 10 as a function of temperature. The Nernst potential for the gas at point A and point C, which represent the Nernst potential at the reversible cell inlet and outlet, are also included in FIG. 10. The thermal-neutral voltage decreases with decreasing temperature. This is because the methane-forming electrolysis reaction is less endothermic than the syngas-forming reaction; not surprising given that methane-forming reactions such as the Sabatier reaction (equation 2), $$4H_2 + CO_2 = CH_4 + 2H_2O, \quad (2)$$

are exothermic. If, instead, the cell is operated between points A and B in FIG. 6, the thermal-neutral voltage is reduced further and the resulting thermal-neutral potentials as a function of temperature are displayed in FIG. 11. This further reduction in the thermal-neutral voltage is understood by observing the change in gas constitution between points B and C in FIG. 8. Between points B and C the methane content changes only slightly at 600° C., while the hydrogen and carbon monoxide content decrease with increasing oxygen content. Therefore, by not operating in this regime, the reversible cell benefits more from the change in methane content observed between points A and B and the thermal-neutral voltage is further decreased (FIG. 11).

The substantial reduction of the thermo-neutral electrolysis voltage makes it possible to carry out reversible SOEC operation with low cell operating potential in electrolysis mode ($V_{EL}$), and hence high maximum theoretical round-trip efficiency ($\eta$) in electrical energy storage. Specifically, the results show that by operating between points A and B, $V_{TN}$ drops to within 0.1V of the Nernst voltage for T≤600° C. Given that the stack requires some excess heat, beyond the thermally neutral condition, to make up for thermal losses experienced in practical systems, an ideal situation is with $V_{TN} \sim V_{NER}$ such that some excess heat is produced in both fuel cell and electrolysis modes. Thus, at T≤600° C., it is possible to operate the cell at $V_{NER} + \Delta V$ in electrolysis mode and $V_{NER} - \Delta V$ in fuel cell mode. In either case, the $\Delta V$ provides the additional heat needed to maintain a sustainable stack operating temperature, as illustrated in FIG. 4. As discussed further below, a $\Delta V$ value of ~0.1 V is probably sufficient. For reversible operation, it should be possible to achieve ~80% round-trip efficiency by operating at $V_{EL} \sim 1.08$ V and $V_{FC} \sim 0.88$ V for $V_{NRE} = 0.98$ V, for example, wherein $V_{FC}$ is the cell operating potential in fuel cell mode.

A key practical issue with the proposed storage method is the availability of SOECs that provide acceptably low area-specific resistance ($R_{AS}$) at ~600° C. To achieve high round-trip efficiency, the devices should operate at relatively small deviations from the open-circuit potential (OCP). For example, for an OCP of 1.0 V, a $V_{EL}$ value of 1.1 V and a $V_{FC}$ value of 0.9 yields a maximum efficiency $V_{EL}/V_{FC} = 0.8$. In order to achieve an acceptable current density (≥0.5 A cm$^{-2}$) during charging and discharging at these low potentials relative to OCP, $R_{AS}$ should be ≤0.2 Ωcm$^2$.

There are several reports of SOECs that can achieve performance in this desired range. These cells normally involve the use of thin electrolytes other than yttria stabilized zirconia (YSZ) in order to achieve a sufficiently low ohmic resistance. There are a number of reports of SOECs with doped Ceria electrolytes that exhibit $R_{AS} \sim 0.3$ Ωcm$^2$ at 600° C., close to the desired range. However, the Ceria-electrolyte cells have the problem of electronic conductivity of the electrolyte that leads to leakage currents that greatly reduce efficiencies in a reversible cycle. Other possible electrolytes include Sc-stabilized Zirconia and (LSGM). There is one report of an LSGM-electrolyte cell that exhibits $R_{AS} \sim 0.15$ Ωcm$^2$ at 600° C. in the desired range (Yan, J. W. et al., 2006 *J. Power Sources* 157, 714-719. The above are for cells utilizing air as the oxidant, and operating instead with pure oxygen oxidant provides a substantial reduction of the cathode polarization resistance and therefore $R_{AS}$. Thus, the above single-cell results demonstrate the feasibility of SOECs with low $R_{AS}$ in the desired temperature range. Key stack problems including interconnects and seals are made easier by a low operating temperature.

Stability issues are reported for SOECs operating in electrolysis mode. In particular, delamination of the oxygen electrode is reported for cell operation at potentials $V_{EL} \leq 1.3$ V. The much-lower $V_{EL}$ values and the lower operating temperatures contemplated in the instant invention substantially reduce, and even eliminate, such degradation mechanisms.

As stated, an embodiment for the method is decreasing the operating temperature of the SOEC. A useful operating range, for example, is the area between the $H_2O$—$CO_2$ line and the coking lines (FIG. 5). The coking/non-coking boundary moves towards the O apex with decreasing temperature over most of the diagram (FIG. 6). However, near the H—O side of the triangle, the boundary moves away from the O apex, opening up an additional operation range between the coking boundary and the $H_2O$—$CO_2$ line. Most of the calculations described herein are done for a H:C ratio of 7.7:1, indicated by the dashed line in FIG. 6 intersecting points A, B and C. At higher H:C ratios, low oxygen contents are accessed without coking if the system is operated at a reduced temperature.

Going from $H_2$/CO products to $CH_4$ frees up oxygen for $H_2O$ and $CO_2$, thereby allowing electrolysis further into oxygen-depleted compositions. Also, pressurization tends to reduce concentration polarization. Thus, these conditions are shown to allow a wider range of fuel oxygen contents (FIG. 12), which has implications for reducing the size of the storage tanks.

In yet another embodiment, operating the SOEC at a reduced temperature also improves the efficiency of conversion of renewable electricity to fuel, as for example, methane. Conversions using solid oxide electrolysis of $H_2O$—$CO_2$ mixtures at ~800° C. produce syngas, which is then introduced into a lower-temperature catalytic reactor to produce an alcohol or hydrocarbon fuel (U.S. Pat. Nos. 7,572,530 and 7,201,979, incorporated herein by reference). A supply of $H_2O$ and $CO_2$ is required for fuel production, unlike an energy storage system where the gases are in a closed loop. Including the exothermic methane-forming reaction inside the SOEC allows a reduction in cell operating voltage in a range of from between 1.0-1.3 V, or, in other words, from ~1.3 to 1.0 V, or <1.1 V, at 600° C. (FIGS. 10 and 11), corresponding to a ~15% reduction in the electrical energy requirement per mole of fuel produced. The fuel produced is a $H_2$—$CH_4$-rich mixture that is ideal for use in solid oxide fuel cells, or it is more completely converted to methane in a separate downstream Sabatier reactor after the addition of $CO_2$. The requirements of an additional reactor is reduced, as the gas mixture already contains a substantial amount of methane.

As discussed above, operation at a lower potential during electrolysis mitigate issues associated with cell stability at higher operating potentials. Thus, the present invention overcomes a degradation problem that otherwise hinders SOEC fuel production technology.

In still another embodiment, the SOEC of the method is operated at an elevated pressure, preferably from between about 1-100 atmospheres, and more preferably from between about 5-100 atmospheres, most preferably from between 10-20 atmospheres. Cell pressurization decreases the thermal-neutral voltage and expands the number of useful C—H—O compositions than can be used in the reversible cell. As discussed herein, the combination of pressure and temperature during both electrolysis and fuel cell mode is crucial.

Figure 12:
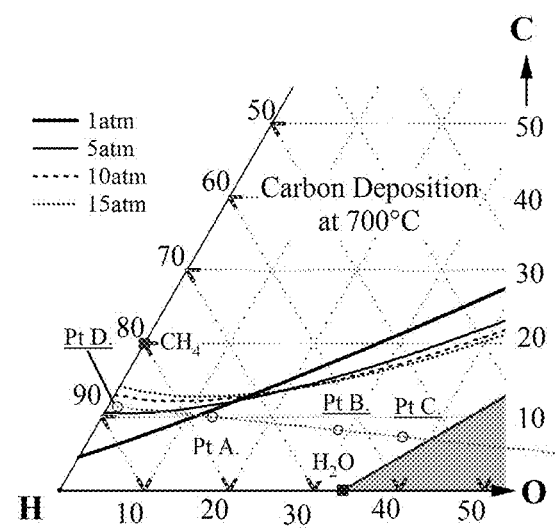
FIG. 12 is a C—H—O ternary diagram showing coking lines at 700° C. from 1 to 15 atm. The dashed line with circles represents a C:H ratio of 1:7.7.
Figure 13:
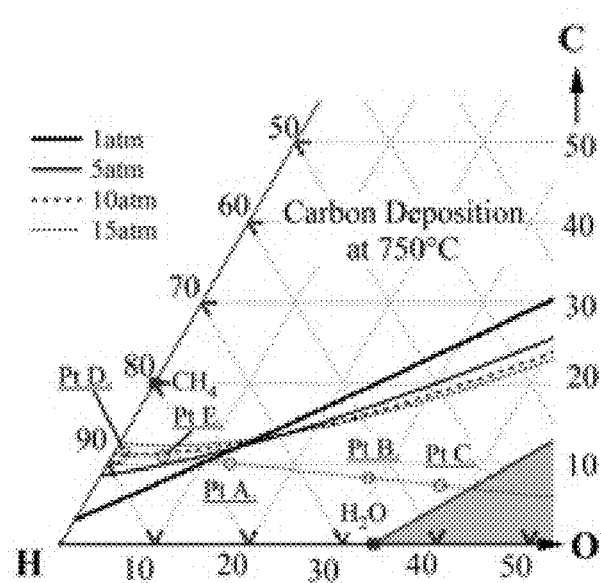
FIG. 13 is a C—H—O ternary diagram showing coking lines at 750 C from 1 to 15 atm. The dashed line with circles represents a C:H ratio of 1:7.7.

The C—H—O ternary diagrams in FIGS. 12 and 13 show the coking limits at 700° C. and 750° C. for pressures of 1, 5, 10 and 15 atm. The coking/non-coking boundary moves towards the O apex with increasing pressure over most of the diagram. However, near the H—O side of the triangle, the boundary moves away from the O apex, opening up an additional operation range between the coking boundary and the $H_2O$—$CO_2$ line. For example, for the C:H ratio described above, the gas is depleted to point D (FIGS. 9 and 10) at 10 atm and 700° C., and at 15 atm and 750° C.

Figure 14:
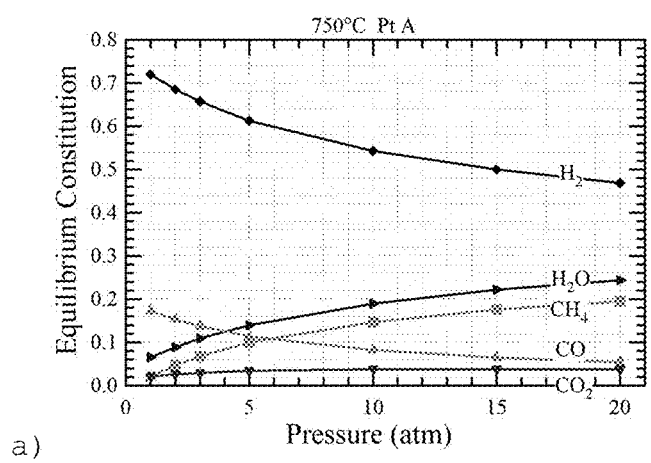
FIG. 14 is a graph depicting gas constitution for point A as a function of pressure at 750° C., a) up to 20 atm, and b) past 100 atm.
Figure 14:
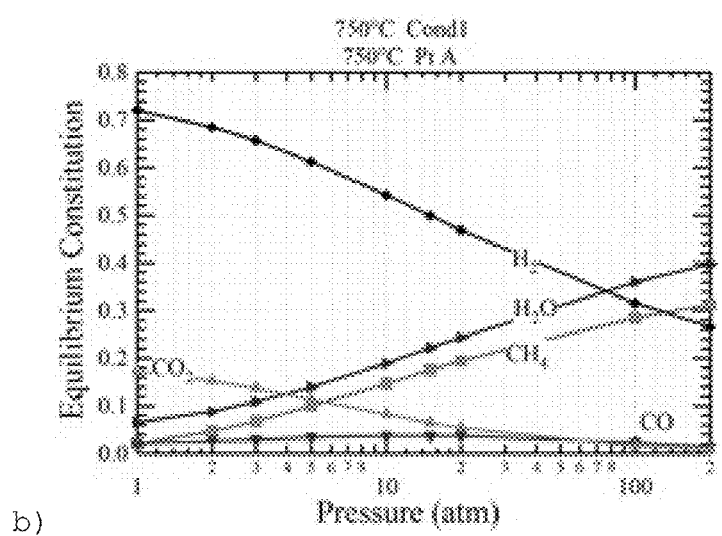
Figure 15:
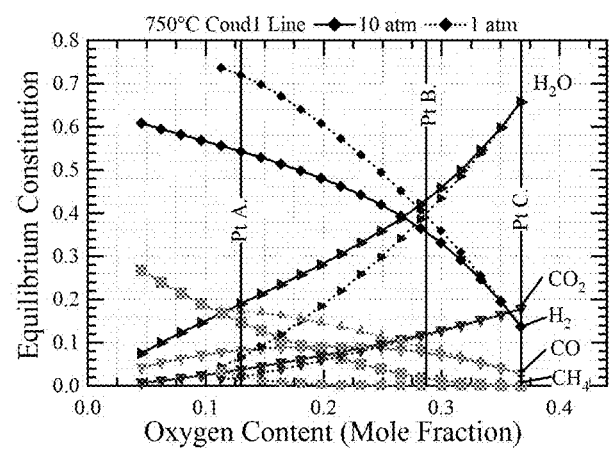
FIG. 15 is a graph depicting gas constitution for a C:H ratio of 0.1:7.7 and different oxygen contents at 750° C. and 1 atm (dashed line) or 10 atm (solid line).

Increasing the operating pressure dramatically widens the range of conditions for which low thermal-neutral voltage is achieved. This arises because the methane content of equilibrated oxygen-depleted gases increases with increasing pressure. For example, at 750° C., the $CH_4$ content increases from ~2% at 1 atm to ~20% at 20 atm at point A (FIG. 14). The CO and $H_2$ content also decrease as a function of pressure. In FIG. 15, the equilibrium gas constitution is displayed as a function of oxygen content for a gas containing a H:C ratio of 7.7:1 at 1 atm and 10 atm at 750° C. Conditions for which coking occurs are omitted. For this H:C ratio, the range of oxygen content for which there exists coke free operation is extended to below 5% oxygen at 10 atm. Between points C and B, as observed above for changes in temperature, the gas constitution does not change significantly between 1 atm and 10 atm. However, for mixtures with an oxygen content lower than the oxygen content at point B, increasing the pressure from 1 atm (dashed lines) to 10 atm (solid lines) decreases the $H_2$ and CO content and increases the $CH_4$ content. At 10 atm, the methane content decreases and the CO content increases with increasing oxygen content; both act to reduce the thermal-neutral voltage.

The thermal-neutral voltages and Nernst potentials are calculated for a system operating between the compositions at point A and point B at 750° C. as a function of pressure. The result of this calculation is presented in FIG. 16. The $V_{TN}$ decreases as pressure increases. At 1 atm, $V_{TN}$=1.272 V, but at 10 atm, $V_{TN}$ is 1.069 V, below the Nernst potential at point A. A second example is provided at 600° C. in FIG. 17. Again, the methane content increases substantially with increasing pressure. The thermal-neutral voltage is displayed as a function of pressure in FIG. 18. For operation between point A and point C. Above 5 atm, the thermal-neutral voltage is less than the Nernst potential at point A and greater than the Nernst potential at point C (up to the maximum pressure tested).

Figure 16:
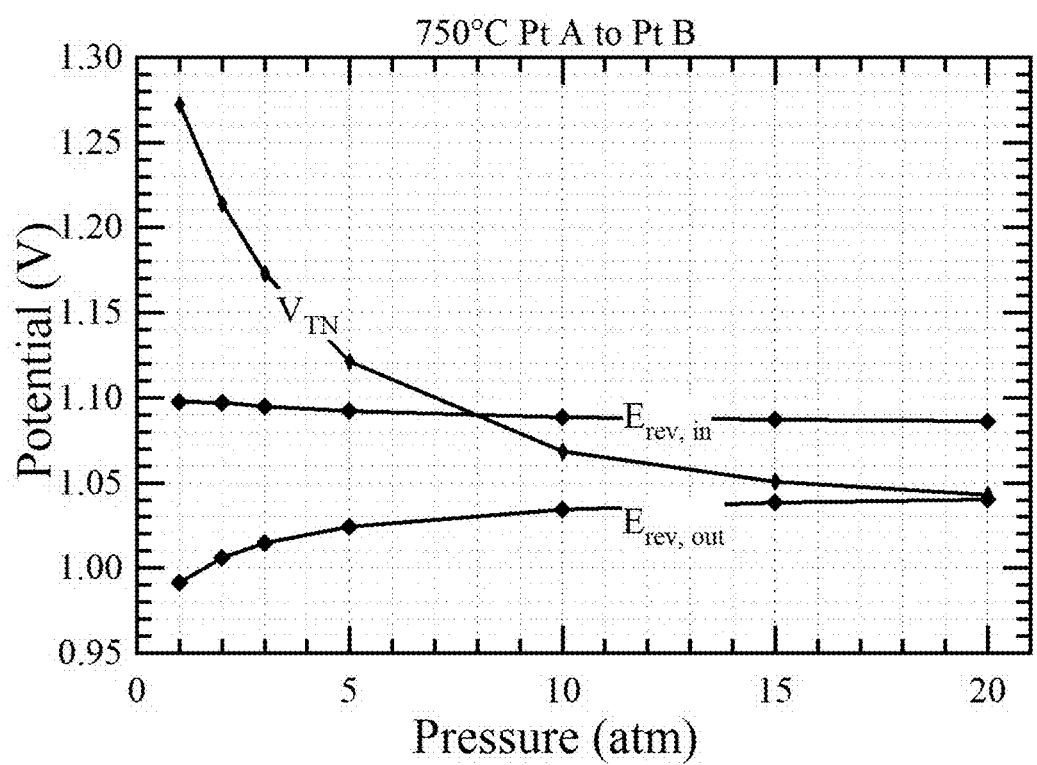
FIG. 16 is a graph showing the Nernst potential and thermal-neutral potential for operation between point A and point B at 750° C. and various pressures.
Figure 17:
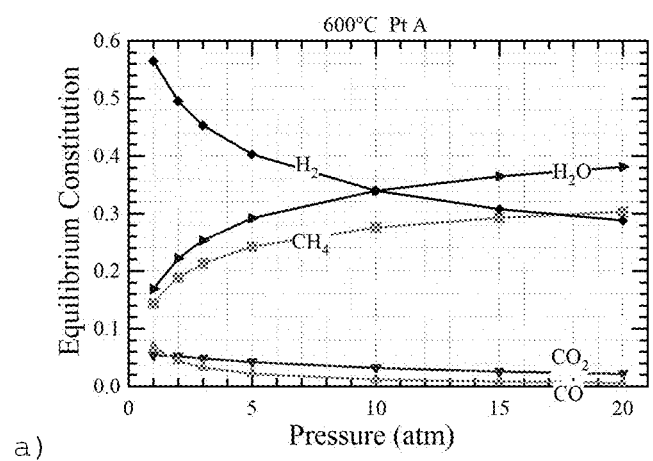
FIG. 17 is a graph depicting gas constitution for point A as a function of pressure at 600° C., a) up to 20 atm, and b) past 100 atm.
Figure 17:
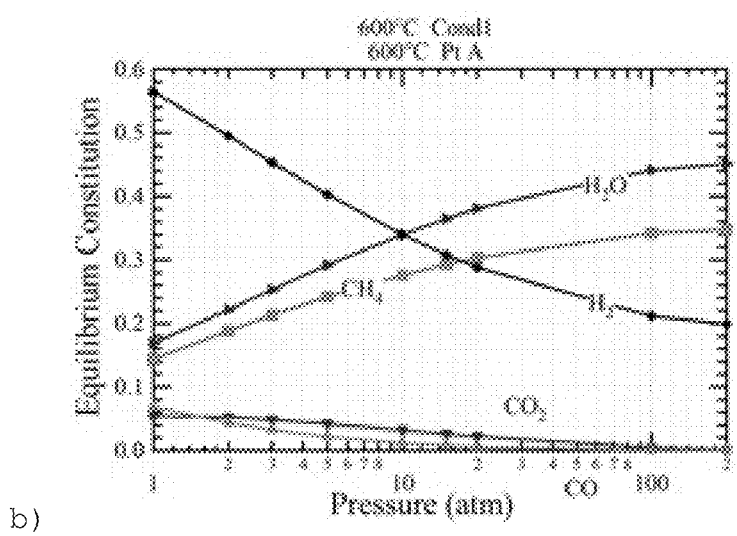
Figure 18:
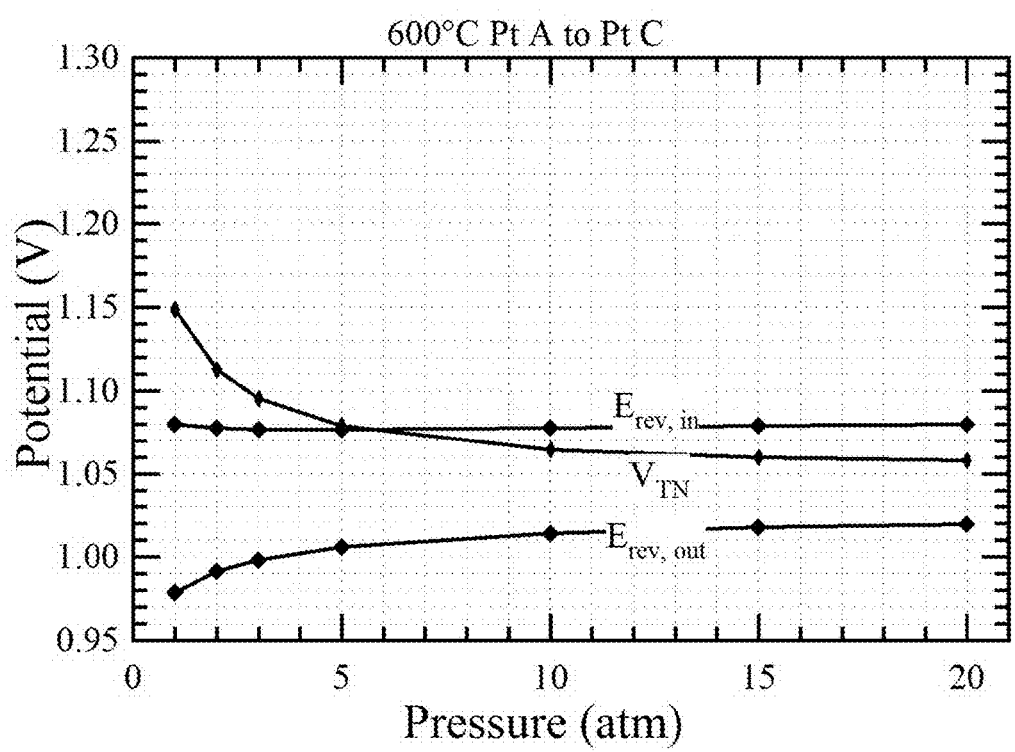
FIG. 18 is a graph showing the Nernst potential and thermal-neutral potential for operation between point A and point C at 600° C. and various pressures.

In yet another embodiment, increasing the pressure produces substantial methane in the exhaust, as shown in FIGS. 14 and 17, while reducing the thermal-neutral voltage (FIG. 16). Thus, this condition is useful for efficiently producing methane-rich fuel from renewable energy. As mentioned previously, the reduced voltage may also aide in reducing cell degradation mechanisms. A pressurized cell is a therefore a viable option for renewable fuel production, similar to the low-temperature condition described above for another embodiment.

In still another embodiment, the SOEC of the method is operated at increased pressure and decreased temperature to improve $V_{TN}$. For example, at reduced temperatures and elevated pressure, a range of conditions for which $V_{TN}$ is 1.1 V or lower is accessible. A Gibbs triangle in FIG. 19 (top) shows the range of conditions possible at 600° C. and pressures from 1 to 15 atm. As discussed above, by increasing the pressure and decreasing the temperature, the coking boundary in the hydrogen-rich region of the Gibb's triangle moves away from the O apex, opening up an additional operation range between the coking boundary and the $H_2O$—$CO_2$ line.

Figure 19:
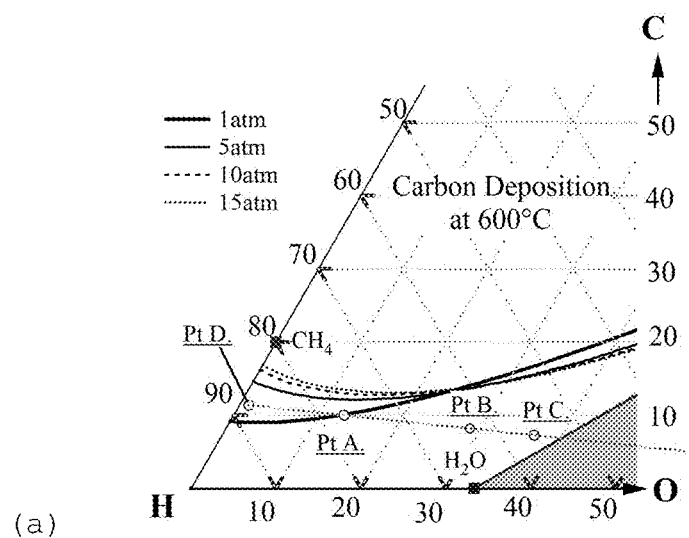
FIG. 19 (a) C—H—O ternary diagram showing coking lines at 600 C from 1 to 15 atm. The dashed line with circles represents a C:H ratio of 1:7.7. (b) Gas constitution for the C:H ratio of 0.1:7.7 and different oxygen contents at 600° C. and 1 atm (dashed line) or 10 atm (solid line).
Figure 19:
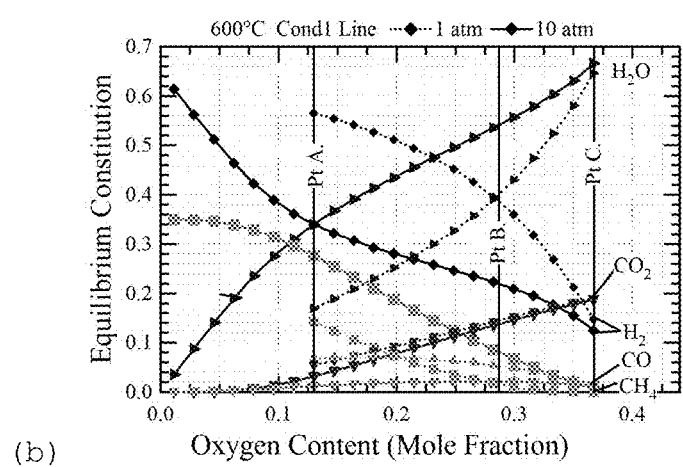

In FIG. 19 (bottom) the equilibrium gas constitution is displayed as a function of oxygen content for a gas containing a H:C ratio of 7.7:1 at 1 atm and 10 atm at 600° C. Again, coke-forming conditions are omitted from the data. At 600° C. and 10 atm, coke formation does not occur at any oxygen concentration (FIG. 16 top).

In contrast to the same gas composition at 750° C., the methane content decreases with increasing oxygen content almost uniformly between points A and C. As observed at 750° C., at point A the $CH_4$ content increases and the $H_2$ and CO content decrease with increasing pressure (FIG. 15).

Figure 20:
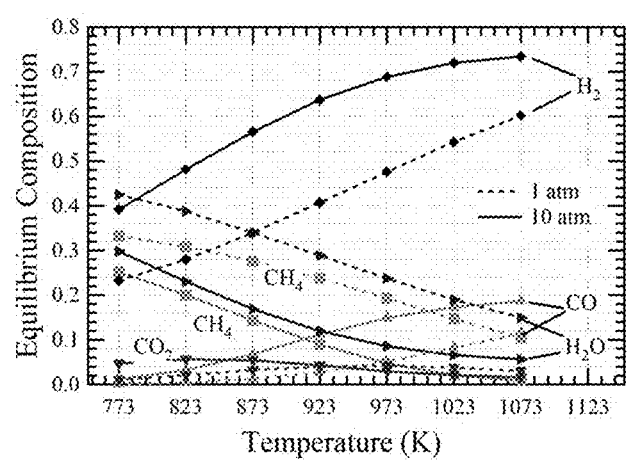
FIG. 20 is a graph depicting the equilibrium gas constitution of the gas composition at point A for a pressure of 1 atm (solid lines) and 10 atm (dashed lines) from 500-800° C.

By adjusting the temperature and pressure of the reversible cell, the thermal-neutral voltage and local heat generation within the cell is controlled. The effect of temperature and pressure are given at point A as an example in FIG. 20. Decreasing the temperature and increasing the pressure from 1 atm to 10 atm both have the effect of increasing the $CH_4$ content and decreasing the CO and $H_2$ content.

Figure 21:
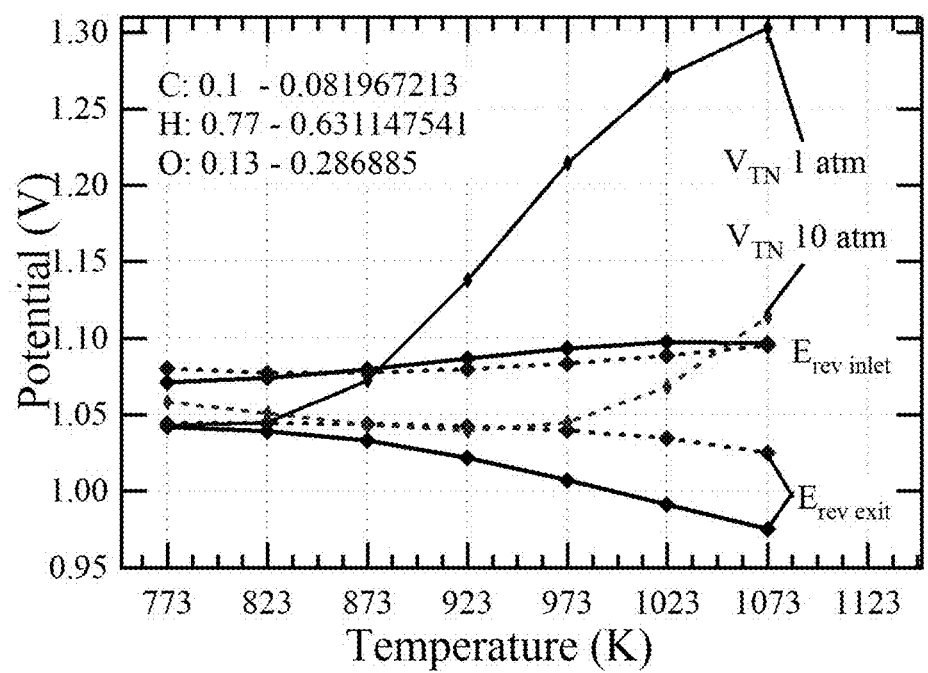
FIG. 21 is a graph showing the thermal-neutral voltage and Nernst potential as a function of temperature for a system operating between Point A and Point B at a pressure of 1 atm (solid) and 10 atm (dashed).

FIG. 21 shows the thermal-neutral voltage as a function of temperature at 1 atm and 10 atm for a reversible cell operating between points A and B. While at 1 atm the thermal-neutral voltage is only below the Nernst potential (at point A) below 600° C., at 10 atm the thermal-neutral voltage is below the oxygen-depleted Nernst potential at 750° C. and below. Below 550° C., a lower thermal-neutral voltage is obtained at 1 atm compared to 10 atm indicating that under some conditions increasing the pressure does not necessarily decrease $V_{TN}$.

Figure 22:
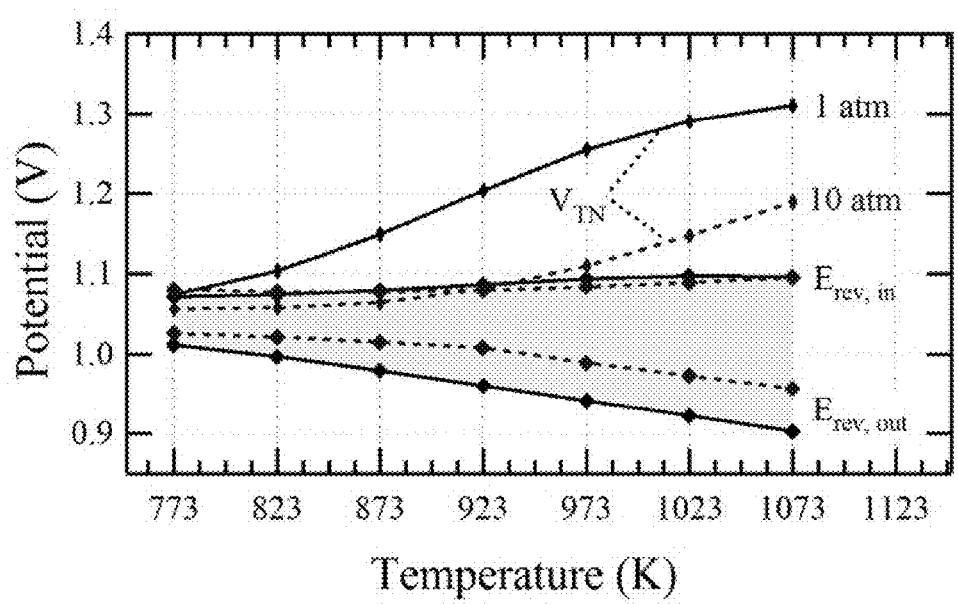
FIG. 22 is a graph showing the thermal-neutral voltage and Nernst potential as a function of temperature for a system operating between Pt A and Point C at a pressure of 1 atm (solid) and 10 atm (dashed).

The range of oxygen content is extended to between points A and C for the reversible cell. The thermal-neutral voltage for this condition at 1 atm and 10 atm is displayed as a function of temperature in FIG. 22. Below ~650° C., the thermal-neutral voltage is below the Nernst potential at point A for a pressure of 10 atm. The Thermal-neutral voltage is significantly higher for the same set of conditions at 1 atm.

Figure 23:
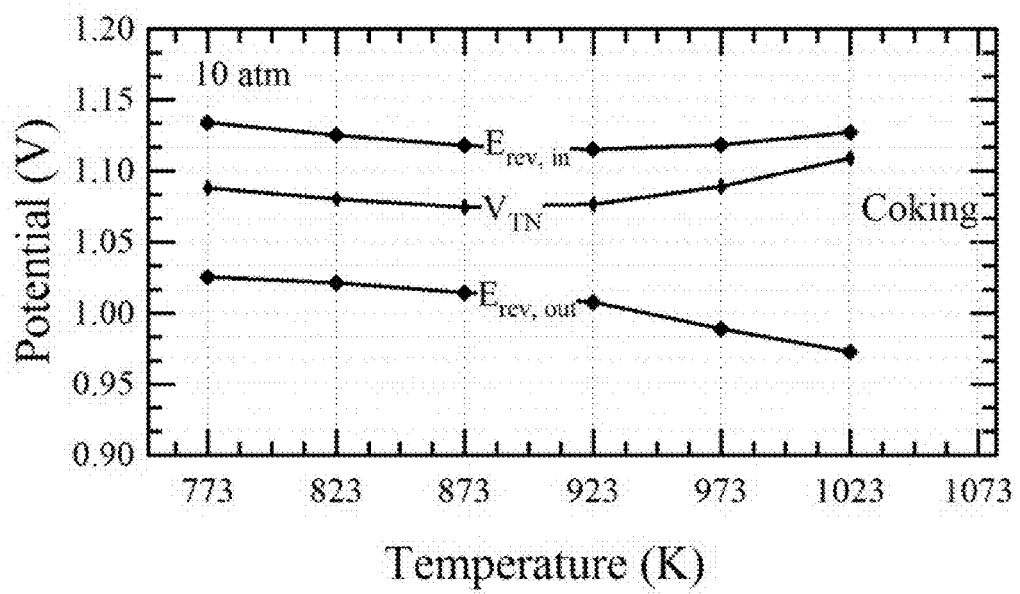
FIG. 23 is a graph showing the thermal-neutral voltage and Nernst potential as a function of temperature for a system operating between conditions Point E and Point C at a pressure of 10 atm.

Because increasing the pressure prevents coke formation at additional oxygen-depleted compositions that typically contain high methane contents at equilibrium, additional improvements are optionally made in the selection of gas compositions to improve the thermal-neutral voltage. For example, by operating between point E and point C in FIGS. 12 and 13, a desirable thermal-neutral voltage is obtained between 500 and 750° C. at 10 atm (FIG. 23).

The thermal-neutral voltage remains below the Nernst potential at point E and above the Nernst potential at point C from 500-750° C. Moreover, because the oxygen content varies widely, the volumetric energy density is increased compared to the situation illustrated in FIG. 21 for operation between points A and B.

In still another embodiment, increasing the pressure and decreasing the temperature produces substantial methane in the exhaust, as shown in FIGS. 15, 17, 19 and 20, while maintaining the thermal-neutral voltage in a good range (FIGS. 15, 17 and 21, 22 and 23). Thus, these conditions are useful for efficiently producing methane-rich fuel from renewable energy. Moreover the reduced voltage probably also reduces cell degradation mechanisms. Based on the increased non-coking range for the pressurized low-temperature case, it is also possible to operate at a lower H:C ratio. This allows reaching higher overall $CH_4$ content, useful for fuel production. As such, a pressurized low-temperature cell is a good option for renewable fuel production.

Figure 24:
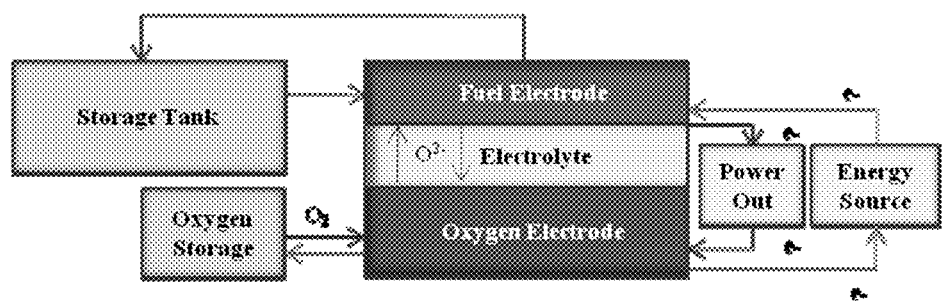
FIG. 24 is a schematic diagram of a single tank reversible SOEC energy storage system.

In another embodiment, FIG. 24 shows schematically the single tank embodiment of a reversible SOEC storage device. The single tank allows for a higher energy storage density. The storage medium contains a mixture of gases composed primarily of $H_2$, $H_2O$, CO, $CO_2$, and $CH_4$. As the device is charged, the cell is operated in electrolysis mode (green arrows) and the storage medium in the storage tank is reduced, becoming enriched with $H_2$, CO, and $CH_4$. As the device is discharged, the SOEC is operated as a fuel cell and the storage medium is gradually oxidized, become enriched in $H_2O$ and $CO_2$. In electrolysis mode, pure oxygen is produced by the SOEC. A possible scenario, as shown in FIG. 24, is that the pure oxygen produced during charging is stored in a second tank and consumed during discharge.

Figure 25:
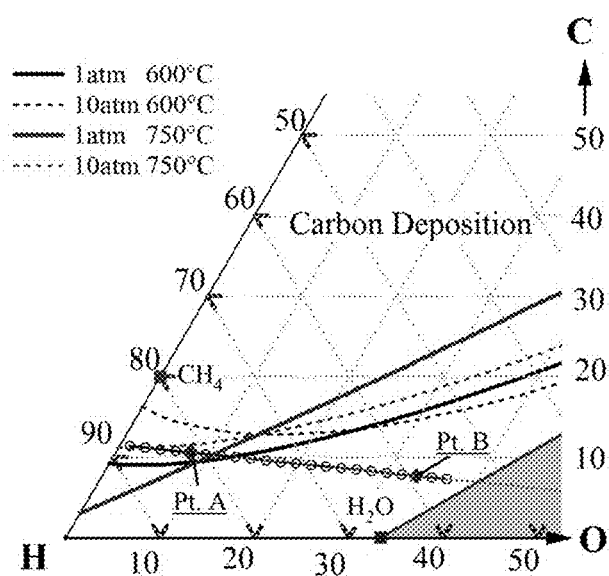
FIG. 25 is a C—H—O ternary composition diagram section.

This process is represented on a C—H—O Gibb's Triangle (FIG. 25) for operation on a storage medium containing an H/C ratio of 7.7. To illustrate the cycle, a system starting at the fully discharged state is considered, with the gas composition at point B. During charging, the gas is circulated through the device's negative electrode. The gas is reduced as it passes through the stack to point A, but is diluted when it returns to the storage tank such that the tank composition gradually becomes more reduced, moving to the left towards point B in FIG. 25. During discharge, the cell current is reversed but the gas continues to circulate in a similar fashion. The storage medium in the tank gradually becomes more oxidized, moving from point A to point B. As such, the composition of the tank changes during a storage cycle.

Figure 26:
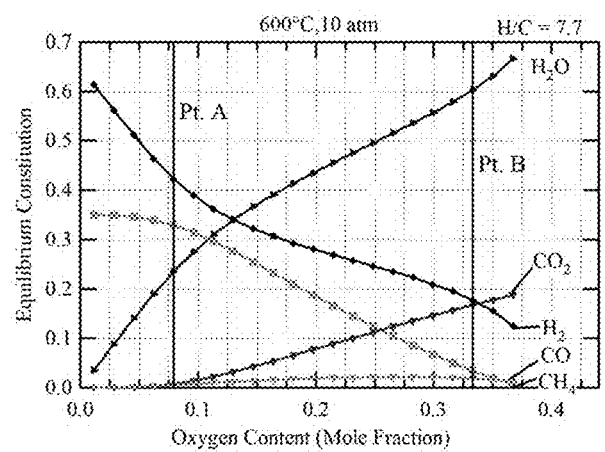
FIG. 26 shows the gas constitution as a function of oxygen content at T=600° C. and P=10 atm.

The gas constitution as a function of oxygen content is shown in FIG. 26 for operation at 600° C. and 10 atm. The thermoneutral and Nernst potentials for this mode of operation are shown in FIG. 27.

Figure 27:
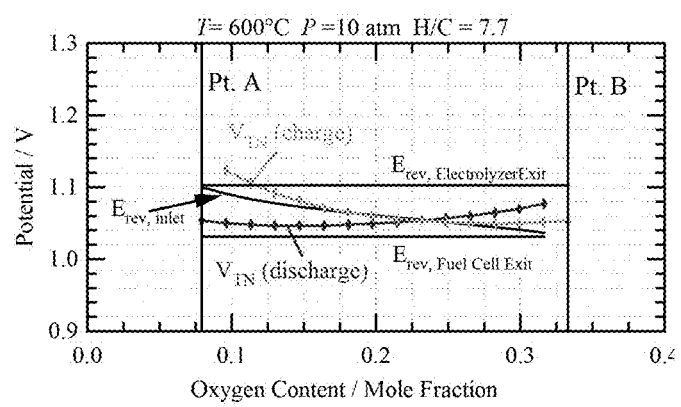
FIG. 27 depicts the thermoneutral voltage for an energy storage system having a single tank design.

As shown in FIG. 27, the thermonetural voltage is near the Nernst potential for the charge cycle (in electrolysis mode) and discharge cycle (in fuel cell mode). This approach is enabled by operation at low operating temperature, high operating pressure, or a combination of the two.

Figure 28:
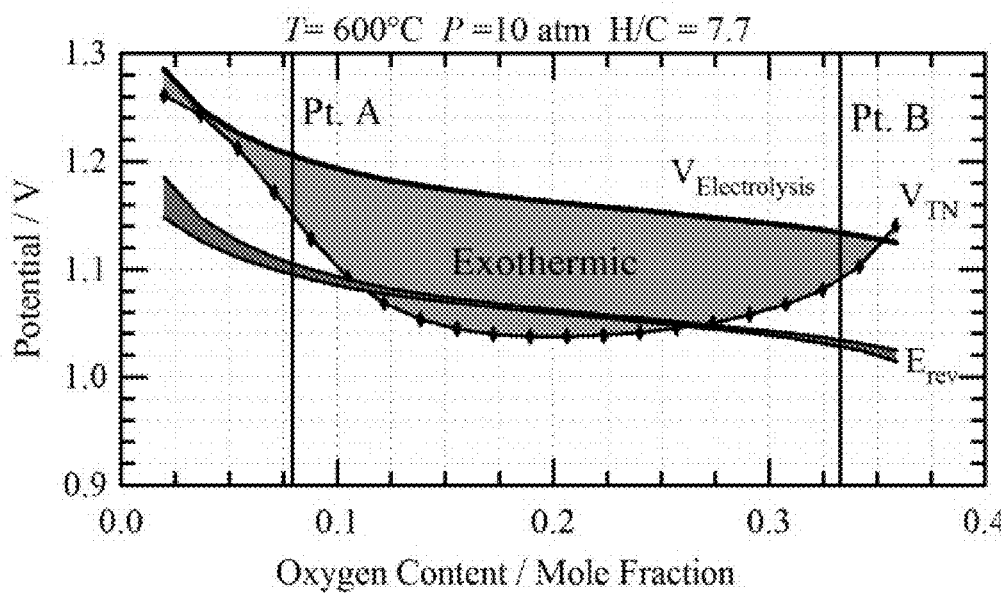
FIG. 28 depicts the thermoneutral voltage for an electricity storage configuration having a single tank design with gradual reduction and oxidation of the storage medium gas. A 0.1V overpotential is shown as (a) $V_{Electrolysis}$ and (b) $V_{Fuel\ Cell}$. The Nernst potential range is also shown for the inlet and exit gas constitution.
Figure 28:
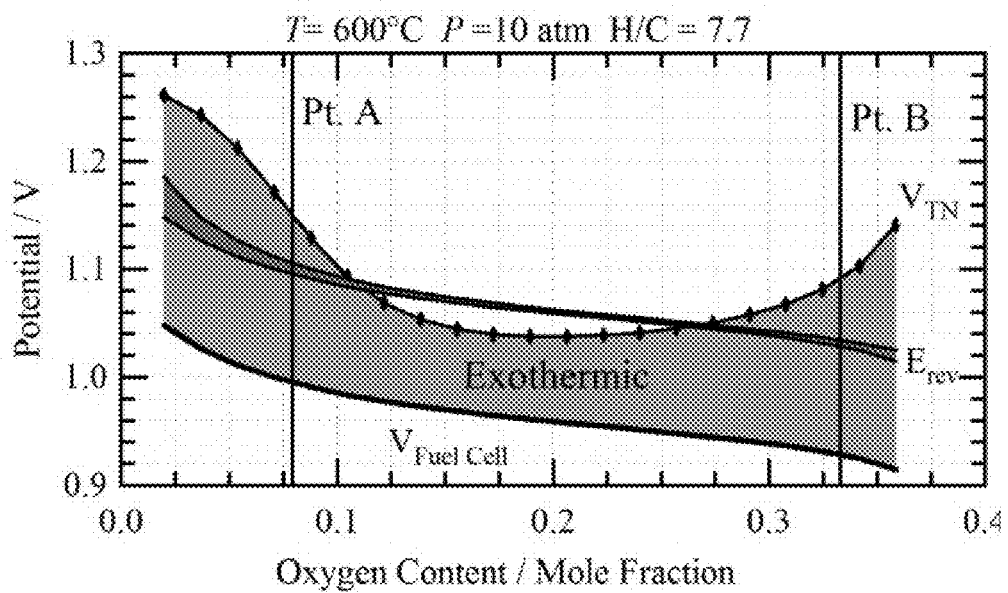

An alternative single tank operating approach involves using high gas flow rates. Again, during charging, the gas is circulated through the device's negative electrode. Because the gas is circulated at a higher flow rate (compared to the above example) the gas is only partially reduced or oxidized on each pass (as opposed to the case above where the gas is reduced to the composition at point A or oxidized to point B). The thermoneutral voltage for a system operating with this approach is shown in FIG. 28. $V_{TN}$ is within 0.1V of the Nernst potential between points A and B. This approach allows for improved thermal management and is also enabled by operation at low operating temperature, high operating pressure, or a combination of the two. Regardless, the reversible solid oxide cell energy storage system can contain one or more storage tanks.

Figure 36:
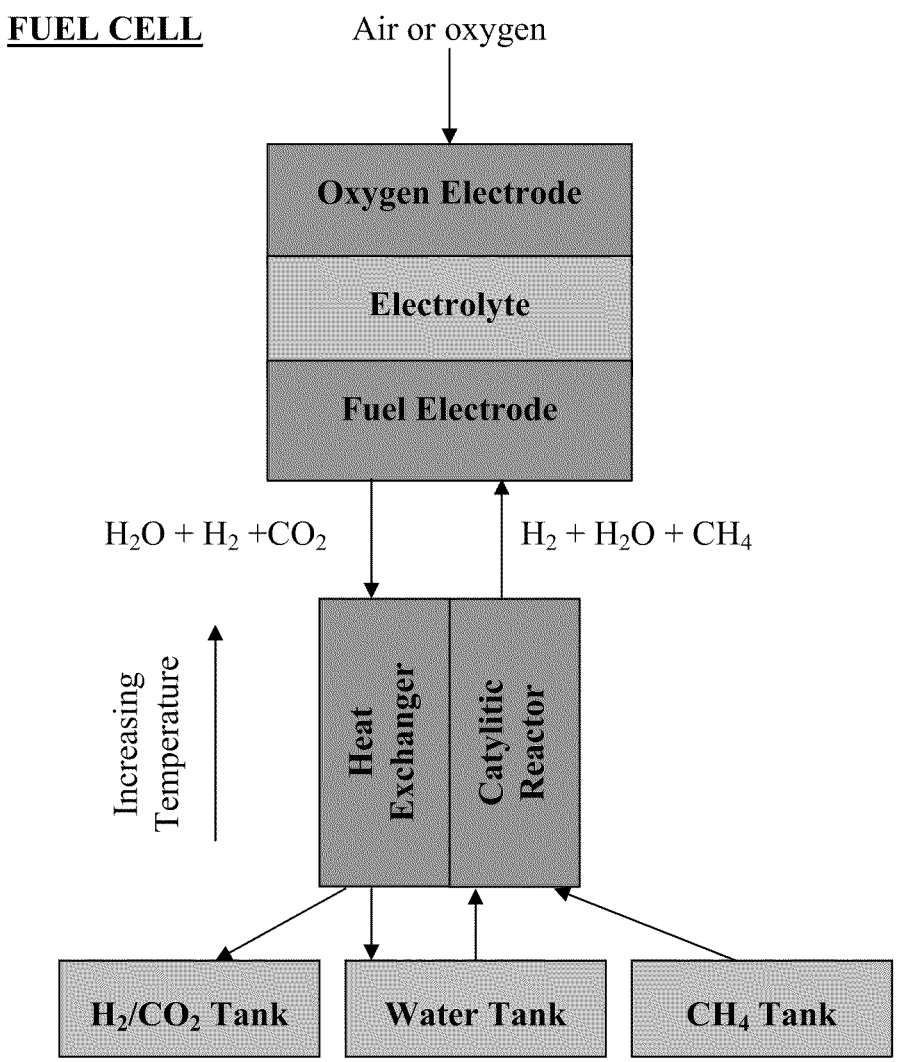
FIG. 36 is a block diagram of an SOEC energy storage system, the arrows indicating a fuel cell mode (arrow directions are reversed for electrolysis mode).

It yet another embodiment, FIG. 36 shows a reversible solid oxide cell energy storage system comprising a thermally-integrated catalytic reactor and a water boiler/condenser (heat exchanger) placed between storage tanks and fuel cell (electrodes and electrolyte). The energy storage system reduces storage costs, converts a fuel mixture of gases to nearly pure $CH_4$, reduces tank temperature to near ambient, and condenses $H_2O$ to allow storage as a liquid. The fuel mixture of gases can range from pure oxygen to ambient air.

As depicted in FIG. 36, the arrows indicate operation of the system in the fuel cell direction. Incoming natural gas is cleaned and then combined with appropriate amounts of $H_2O$ in the catalytic reactor to produce an equilibrium fuel mixture (point 2). $O_2$ may also be added to make this autothermal reforming, i.e. no external heat is required to maintain the reactor at temperature. The SOEC electrolysis process produces pure oxygen that is stored and available for use in reforming and/or available in the oxygen side of the SOEC. $CH_4$ is combusted with air in a separate, but thermally integrated, combustor. The fuel is then oxidized in the SOEC to produce electricity and yield the exhaust composition at point 1. The main constituent of this mixture is $H_2O$, which is condensed out leaving a $CO_2$—$H_2$-rich gas mixture. As seen in FIG. 36, the compositions in each of the tanks do not vary during a storage cycle.

During electrolysis (arrows reversed in FIG. 36), the fuel product is converted to $CH_4$ and $H_2O$ in the low temperature reactor. When the product is cooled to ambient temperature and the $H_2O$ is condensed out, the resulting gas is highly enriched in $CH_4$. This $CH_4$-rich product can be fed, with minimal additional processing, into the natural gas infrastructure.

While the system shown in FIG. 36 utilizes three storage tanks, the overall tank volume is minimized for large-scale storage by storing methane and water in existing infrastructure. The main storage capacity needed is for the $CO_2$—$H_2$-rich gas mixture, which constitutes a relatively small fraction of the total amount of stored fuel.

Experimental

Figure 29:
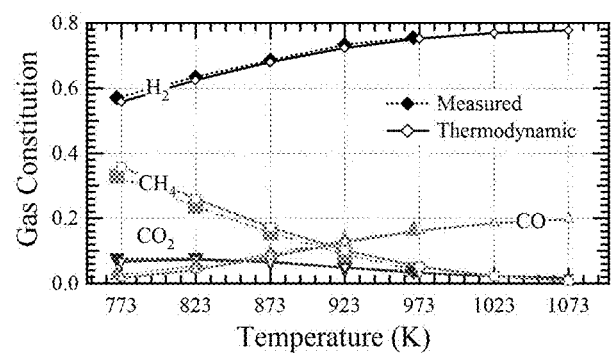
FIG. 29 is a graph showing experimentally observed gas composition for a 0.6 g Ni-YSZ pellet exposed to 22 sccm gas initially containing 12% $CO_3$ 82% $H_2$ and 9% $CO_2$ (Point A). The experimental results are compared to the equilibrium prediction and reported on a dry basis.

The above thermodynamic results leave open the question of whether the predicted gas compositions can actually be accessed kinetically. That is, during electrolysis operation, the fastest reaction is most likely $H_2O$ reduction to $H_2$, and the production of $CH_4$ is likely to occur during a subsequent Sabatier reaction (eq. 2). Ni is a common catalyst for this reaction, and is also present in most SOEC fuel electrodes. While the projected operating temperature of ~600° C. is well above the usual reaction temperature, such that kinetics are relatively fast, the Ni-cermet material is not optimized to work as a catalyst, but rather as an electrode. Thus, it is important to have an experimental validation that there are kinetic pathways allowing the cells to produce products approaching the above equilibrium predictions, particularly $CH_4$. An initial experimental test is carried out to test the catalytic activity of a Ni-YSZ anode support of a standard SOFC. FIG. 29 shows the measured gas compositions after a $H_2$—$CO_2$ mixture is flowed over the anode at various temperatures. Substantial $CH_4$ is present in the exhaust. At 600° C., for example, the gas is ~16% $CH_4$ compared to the equilibrium prediction of ~17%.

Figure 30:
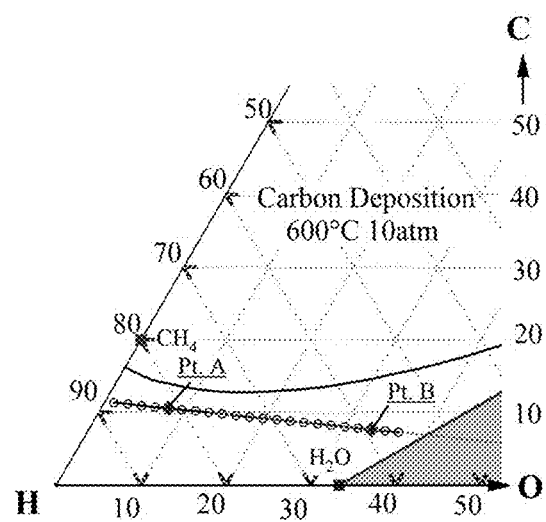
FIG. 30 is a C—H—O ternary diagram showing the coking line at 600 and 10 atm. The dashed blue line with circles represents a C:H ratio of 1:7.7.
Figure 31:
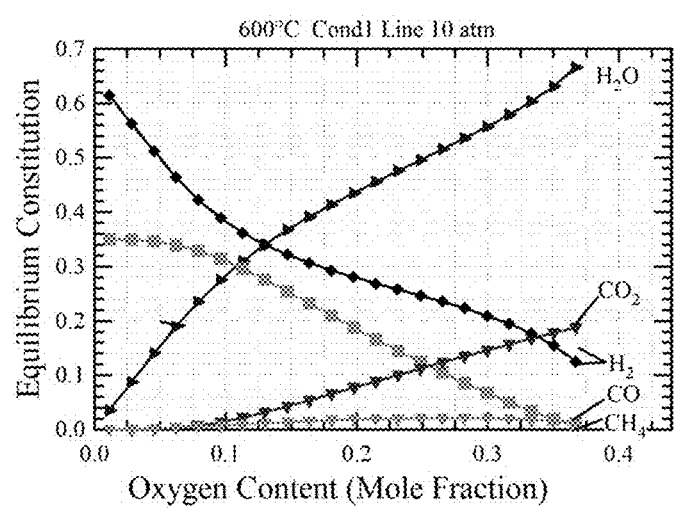
FIG. 31 is a graph showing equilibrium gas constitution at 600° C. and 10 atm.
Figure 32:
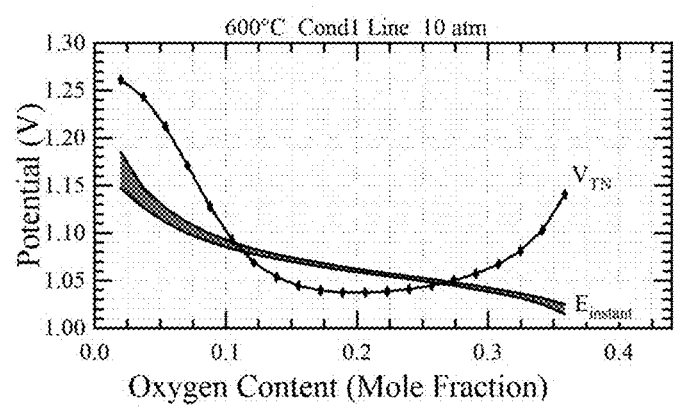
FIG. 32 depicts the "local" thermal-neutral voltage and Nernst potential at 600° C. and 10 atm.

The conditions selected for cell operation are used to improve the thermal management within a stack. The CHO ternary diagram in FIG. 30 contains the profile for a gas consisting of a carbon to hydrogen ratio of 1:7.7 and variable oxygen content at 600° C. and 10 atm. As the oxygen content of the gas changes along this line, as it varies as a function of position in an operating stack, the equilibrium gas constitution changes (FIG. 31). Using the gas constitution displayed in FIG. 31 for each point in FIG. 30, the Nernst potential is calculated and displayed in FIG. 32 as a function of oxygen content. Point A, for example, with a C:H:O content of 0.1:0.77:0.13, results in an oxygen partial pressure of 1.2e-25 atm and has a Nernst potential (for a pure oxygen positive electrode) of 1.08 V. In contrast, the thermal-neutral voltage is dictated by how the gas composition is changing. The thermal-neutral voltage is calculated (FIG. 32) between adjacent points on the line displayed in FIG. 30. For oxygen depleted compositions, the thermal-neutral voltage is high, but as oxygen content is increased, the thermal-neutral voltage decreases, is below the Nernst potential for a range of oxygen contents, and then increases again with increasing oxygen content. This trend is understood when compared to the variation of gas constitution with oxygen content in FIG. 31 (the change in gas composition determines $V_{TN}$). For oxygen-depleted compositions, the methane content is high (~35%) but does not vary strongly with oxygen content until ~5-10% oxygen, while the hydrogen content decreases rapidly with increasing oxygen content. Therefore, a high thermal-neutral voltage is observed in this range (FIG. 32). Between ~10 and ~30% oxygen, the methane content decreases with increasing oxygen content indicating that a large fraction of the oxygen is consumed by methane (or is created from $H_2O$ and $CO_2$ during electrolysis). As a result, the thermal-neutral voltage is low.

Figure 33:
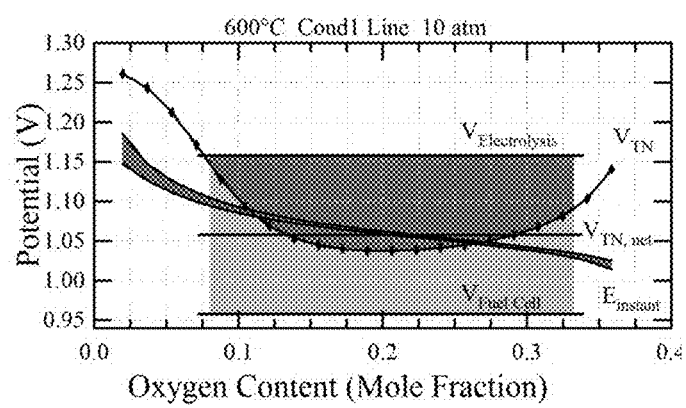
FIG. 33 shows the possible operating range at 600° C. and 10 atm. The darker shaded region represents heat generated during electrolysis operation at V=1.158V and the lighter shaded region represents heat generated in fuel cell mode for operation at 0.958V.

FIGS. 31 and 32 are then used as tools to predict local conditions in a fuel cell stack. During discharging, fuel enters the stack with the composition at point A. As the gas flows through the cell channels, oxygen is added proportionally to the local current density and the oxygen content of the gas gradually increases. Because the gas is in contact with a catalyst in the stack, the gas composition remains near equilibrium and the gas constitution varies as a function of position similar to the way it varies with oxygen content. Similarly, the thermal-neutral voltage as a function of oxygen content in FIG. 32 is also used to approximate the local thermal-neutral voltage in the stack as a function of position. The difference between the local thermal-neutral voltage and the cell operating voltage is proportional to the heat generated or consumed locally. This is illustrated in FIG. 33. During fuel cell mode, if the thermal-neutral voltage is above the operating potential, then the reaction is exothermic. Similarly, during electrolysis if the thermal-neutral voltage is below the electrolysis operating voltage, then the reaction is exothermic. When considering the net operation of the cell, the net heat generation is $zF(V_{TN}-V_{EL})$. However, this can also be applied locally to the stack. The local heat generation is $ZF(V_{TN,local}-V_{EL})$. Assuming that the cell potential does not vary as a function of position in the stack, the thermal-neutral voltage is used to predict heat generation in the stack as a function of oxygen content (and therefore position) (FIG. 33). The darker shaded region represents heat generated during electrolysis operation at V=1.158V and the lighter shaded region represents heat generated in fuel cell mode for operation at 0.958V. This situation is ideal in that the heat generation is uniform throughout the cell in both fuel cell mode and electrolysis mode and the electrical efficiency is >80%.

Figure 34:
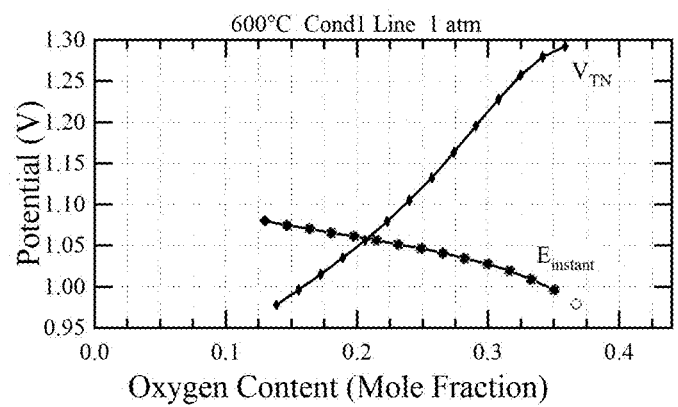
FIG. 34 depicts the "local" thermal-neutral voltage and Nernst potential at 600° C. and 1 atm.
Figure 35:
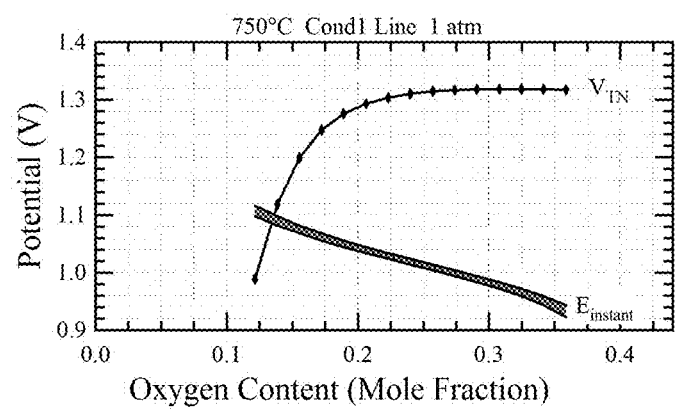
FIG. 35 depicts the "local" thermal-neutral voltage and Nernst potential at 750° C. and 1 atm.

In contrast, operation at 600° C. and 1 atm, the thermal-neutral voltage varies more with oxygen content (FIG. 34). Likewise, at 750° C. (FIG. 35), the thermal-neutral voltage increases rapidly with oxygen content up to ~25% oxygen. Above 25% oxygen, the thermal-neutral voltage approaches an average of the thermal-neutral voltage for $H_2$ and CO formation.

For the two-tank reversible system, the size of the tanks is inversely proportional to the percentage of oxidation between the inlet and outlet compositions for the fuel electrode. As discussed previously, the two gas compositions are chosen from a range of possibilities that most likely are a result of optimizing other factors such as current density, temperature, pressure, etc.

Based on the analysis, it is important to acknowledge that the size and cost of the fuel tanks is not unreasonable in relation to the rest of the system. For example, for a system designed to go from point A to point B, as shown in FIG. 30, at 600° C. and 1 atm, ~25 Wh of electricity are stored/produced per mole of gas. For a 200 kW system storing energy for 12 hours, this equates to a tank size on the order of 30,000 liters (stored at 17 atm and 290° C.). If points with a greater range of oxidation compared to A and B are chosen, the necessary tank size proportionally shrink. Pressurization of the cell raises the coking line for highly reduced compositions (as shown in FIG. 19), providing a wider range of available compositions to further decrease the tank size. The single tank design allows for a greatly improved energy storage density and simplified balance of plant. It should be noted that underground storage of the storage medium gas may be a cost effective approach to storing the gas.

The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. A method for fuel production comprising
providing a reversible solid oxide cell energy storage system comprising: a) a solid oxide fuel cell comprising an electrolyte, an oxygen electrode and a fuel electrode to catalytically promote methane formation under operation, thereby producing sufficient heat in the solid oxide reversible fuel cell to reduce the thermo-neutral voltage below 1.3 V; b) one or more storage tanks attached to the solid oxide fuel cell to store liquid or gaseous reactants and products; and c) a heat exchanger, wherein the heat exchanger is located between the one or more storage tanks and the solid oxide fuel cell, said system absent a Sabatier reactor;
operating the solid oxide reversible fuel cell in electrolysis mode at a thermo-neutral voltage of from between 1.0-1.3 V and improve efficiency of said cell; and generating a fuel mixture within the solid oxide reversible fuel cell, the fuel mixture comprising hydrogen and at least about 10% methane, said mixture sufficient for use in said cell without the Sabatier reactor.

2. A method according to claim 1 wherein electrolysis mode is operated at an operating pressure of 5-100 atmospheres, and at an operating temperature of 700-850° C.

3. A method according to claim 2 wherein the operating pressure is 10-20 atmospheres.

4. A method according to claim 1 wherein electrolysis mode is operated at an operating pressure of 1-5 atmospheres, and at an operating temperature of 500-700° C.

5. A method according to claim 1 wherein electrolysis mode is operated at an operating pressure of 5-100 atmospheres, and at an operating temperature of 500-700° C.

6. A method according to claim 1 wherein the generated fuel is catalytically converted to methane.

7. A method according to claim 1 wherein electrolysis mode is operated under conditions wherein the thermal-neutral voltage is approximately equal to the Nernst potential.

8. A method according to claim 1 further comprising providing the stored at least 10% methane-containing fuel mixture, and oxygen or air, to the solid oxide reversible cell, and operating the solid oxide reversible cell in a fuel cell mode using the provided fuel, and oxygen or air, to produce electricity.

9. A method according to claim 8 wherein fuel cell mode is operated at an operating pressure of 5-100 atmospheres, and at an operating temperature of 700-850° C.

10. A method according to claim 9 wherein the operating pressure is 10-20 atmospheres.

11. A method according to claim 8 wherein fuel cell mode is operated at an operating pressure of 1-5 atmospheres, and at an operating temperature of 500-700° C.

12. A method according to claim 8 wherein fuel cell mode is operated at an operating pressure of 5-100 atmospheres, and at an operating temperature of 500-700° C.

13. A method for electrical energy storage comprising: providing a reversible solid oxide cell energy storage system comprising a solid oxide fuel cell comprising an electrolyte, an oxygen electrode and a fuel electrode to catalytically promote methane formation under operation, thereby producing sufficient heat in the solid oxide reversible fuel cell to reduce the thermos-neutral voltage below 1.3 V;

One or more storage tanks attached to the solid oxide fuel cell to store liquid or gaseous reactants and products; and a heat exchanger, wherein the heat exchanger is located between the one or more storage tanks and the solid oxide fuel cell, said system absent a Sabatier reactor;

a) operating the solid oxide reversible fuel cell in electrolysis mode at a thermal-neutral voltage of from between 1.0-1.3 V, at a first operating temperature of 500-850° C., and a first operating pressure of 1-100 atmospheres to generate within the solid oxide reversible cell a fuel mixture comprising hydrogen and at least 10% methane;

b) providing the fuel mixture, and oxygen or air, to the solid oxide reversible fuel cell; and c) operating the solid oxide reversible fuel cell in fuel cell mode using the provided fuel, and oxygen or air, at a second operating temperature of 500-850° C. and a second operating pressure of from between 1-100 atmospheres to produce electrical energy.

14. A method according to claim 13 wherein electrolysis mode is operated under conditions wherein the thermal-neutral voltage is approximately equal to the Nernst potential.

15. A method according to claim 13 wherein the first operating pressure and the second operating pressure are independently 5-100 atmospheres, and the first operating temperature and the second operating temperature are independently 700-850° C.

16. A method according to claim 15 wherein the first operating pressure and the second operating pressure are independently 10-20 atmospheres.

17. A method according to claim 13 wherein the first operating pressure and the second operating pressure are independently 1-5 atmospheres, and the first operating temperature and the second operating temperature are independently 500-700° C.

18. A method according to claim 13 wherein the first operating pressure and the second operating pressure are independently 5-100 atmospheres, and the first operating temperature and the second operating temperature are independently 500-700° C.

* * * * *